Oct. 22, 1963

E. R. LOYD ETAL 3,107,517

NATURAL GAS LEAK DETECTION

Filed May 31, 1960

INVENTORS
MARTIN C. KELSEY,
EDWARD R. LOYD &
JAMES F. ROLLINS

BY

ATTORNEY

Oct. 22, 1963  E. R. LOYD ETAL  3,107,517
NATURAL GAS LEAK DETECTION

Filed May 31, 1960  4 Sheets-Sheet 2

INVENTORS
MARTIN C. KELSEY,
EDWARD R. LOYD &
BY JAMES F. ROLLINS,

Jerry J. Danley
ATTORNEY

INVENTORS
MARTIN C. KELSEY,
EDWARD R. LOYD &
BY JAMES F. ROLLINS

ATTORNEY

United States Patent Office  3,107,517
Patented Oct. 22, 1963

3,107,517
NATURAL GAS LEAK DETECTION
Edward R. Loyd, Martin C. Kelsey, and James F. Rollins, Dallas, Tex., assignors to Rayflex Exploration Company, Dallas, Tex., a corporation of Texas
Filed May 31, 1960, Ser. No. 32,660
17 Claims. (Cl. 73—23)

This invention relates generally to improvements in the art of detecting leaks in natural gas distribution systems, and more particularly, but not by way of limitation, to a vehicular mounted and highly mobile leak detection apparatus.

As it is well known in the art, leaks in natural gas distribution systems are extremely hazardous, particularly in urban areas. Since the presence of natural gas in the atmosphere is virtually undetectible by the sense of smell, unless the gas has been odorized, the time-honored method of testing for gas leaks has been by a procedure known as bar hole testing, which involves the forming of a large number of holes in the ground in the suspected leak area. The bar hole testing procedure is both time-consuming and expensive, which prohibits the use thereof as a general surveying method for the detection of minor leaks over an entire distribution system. As a result, substantial effort has been expended by workers in the art to attain a mobile, yet sensitive gas detection apparatus.

It has previously been known to mount a gas analyzer in a motor vehicle and continuously sample the atmosphere as the vehicle is moved in proximity with a gas distribution system. Heretofore, however, such systems have utilized a small sampling tubing extended from the motor vehicle in proximity with the street or road and connected directly to the gas analyzer, such that an extremely small portion of the atmospheric gases along the path of travel of the motor vehicle are scanned by the apparatus. In other words, the amount of atmospheric gases distributed or moved by prior detection systems have been equal to the amount of gases which can be passed through the gas analyzer. As a result, if the intake end of the detection system is not moved substantially directly over a gas leak or directly downwind of the gas leak, the presence of a gas leak is not indicated by the analyzer. On windy days, such systems are highly unpredictable.

Two basic types of gas analyzers are presently commercially available. One type is a hot wire combustible gas detector which is highly desirable from a stability viewpoint in that such a detector is not appreciably affected by acceleration forces, whereby such a detector can be easily mounted in a motor vehicle and response of the detector will not be materially affected by erratic movements of the vehicle. However, a hot wire type of detector is relatively insensitive and is useful only in detecting serious gas leaks. The other type of gas analyzer presently available relies upon the absorption of infrared rays by a standard gas and by the sample being analyzed to flex a diaphragm supported in the instrument and forming one plate of a capacitor. In this latter type of analyzer, the diaphragm is highly sensitive to acceleration forces and provides an erratic output when the diaphragm is flexed for any reason other than the presence of methane in the gas sample being analyzed. Up to the present time, no mounting for a diaphragm or infrared type of analyzer has been available for mounting the analyzer in a motor vehicle without rendering the analyzer subject to erratic movements of the motor vehicle with consequent erratic flexure and output of the diaphragm.

The present invention contemplates a novel leak detection method and a novel gas leak detector apparatus which is particularly useful in or in connection with a motor vehicle for making a fast and efficient survey of a gas distribution system. In use of the present invention, a substantial amount of atmospheric gases are scanned along the path of travel of a detecting apparatus and efficient sampling of the atmospheric gases is obtained. The present invention also contemplates a novel suspension-type mounting system for the diaphragm-type gas analyzer in a motor vehicle, such that the diaphragm of the analyzer will be substantially unaffected by movement of the vehicle and the analyzer will be fully responsive to variations in the methane content of atmospheric gases passed through the analyzer. The present invention further contemplates a novel gas leak detector apparatus utilizing a hand probe for scanning areas inaccessible to the motor vehicle, with the sampled atmospheric gases being passed through the same flow path to the analyzer, regardless of the distance the hand probe is used from the analyzer.

In one of its broader aspects, the present invention may be defined as an apparatus for detecting fuel gas leaks along a street or the like, comprising a motor vehicle, a fuel gas concentration analyzer having an inlet and an outlet, means for mounting the analyzer on the vehicle, a blower on the vehicle having an inlet and an outlet and having a capacity substantially larger than the gas capacity of the analyzer, a probe carried by the vehicle in a position to scan a path along the street during movement of the vehicle, a first conduit connecting the probe and the blower inlet for moving a substantial gas stream through the probe and blower compared with the capacity of the analyzer, and a sampling conduit communicating with the blower outlet and the analyzer inlet for directing a portion of said gas stream through the analyzer.

An important object of this invention is to increase the safety of gas distribution systems by the fast and efficient location of leaks in the system.

Another object of this invention is to provide apparatus for detecting the presence of leaks in a natural gas distribution system, regardless of the accessibility of the distribution system.

A further object of this invention is to detect the presence of leaks in an urban gas distribution system by merely sampling the atmospheric gases along the streets under which the gas distribution lines extend.

A further object of this invention is to detect the presence of a leak in a gas distribution system, regardless of whether the path of travel of the detecting apparatus is upwind or downwind of the leak, as long as the path of travel of the detecting apparatus is within proximity of the leak.

A still further object of this invention is to efficiently detect the presence of leaks in a gas distribution system, even in the presence of relatively high winds.

Another object of this invention is to provide a gas leak detection system utilizing a diaphragm-type gas analyzer, wherein the analyzer is mounted in a motor vehicle yet will be insensitive to movements of the vehicle.

Other objects and advantages of the invention will be evident from the following detailed description, when read in conjuction with the accompanying drawings which illustrate our invention.

Figure 1:
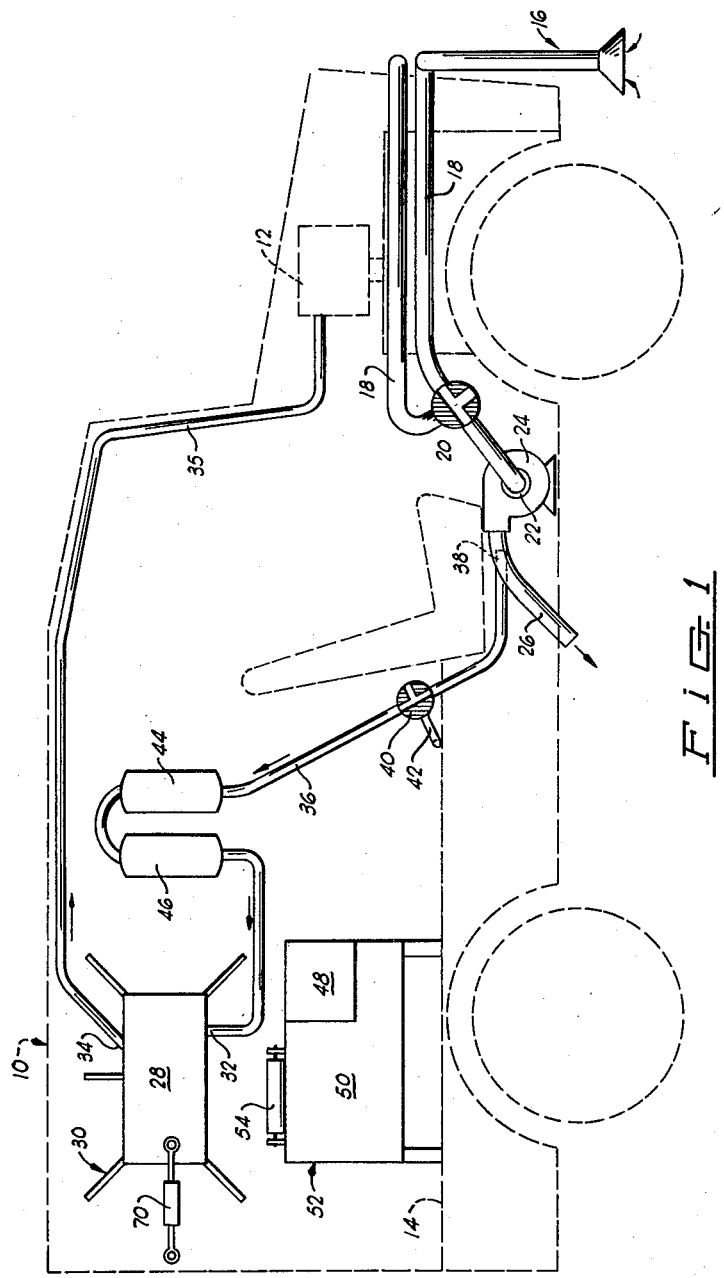
FIGURE 1 is a schematic elevational view of a gas leak detection system constructed in accordance with this invention illustrating use of the system in a motor vehicle.

Referring to the drawings in detail, and particularly FIG. 1, reference character 10 generally designates an internal combustion-type motor vehicle having an intake manifold assembly 12 in the forward portion of the vehicle and a suitable platform 14 in the rear portion of the vehicle. Probes, generally designated by reference character 16, are mounted on opposite sides of the vehicle 10 (as will be expalined more in detail below) and are connected by conduits 18 through a three-way valve 20 to the ontake 22 of a blower 24. The blower 24 is mounted in the vehicle 10 in any suitable manner and is preferably driven by a power take-off (not shown) from the engine of the vehicle 10 to draw a substantial quantity of atmospheric gases through one of the probes 16 and discharge such gases through a discharge conduit 26 directed outside of the vehicle 10. The blower 24 is of substantial capacity, such as 6,000 cubic feet per hour, to circulate an appreciable quantity of atmospheric gases from either of the probes 16 through the discharge conduit 26, such that a portion of any natural gas present in the atmosphere in proximity with the path of travel of the vehicle 10 will be directed through the blower 24. In other words, if a natural gas leak is present in proximity with the path of travel of the vehicle 10, at least a portion of the leaking gas will be drawn through the probe 16 communicating with the blower 24, regardless of whether the respective probe 16 is moved slightly upwind or downwind from the leak. To provide further assurance that a portion of the gas escaping by way of a leak from a gas distribution system will be passed through the blower 24, we provide one of the probes 16 on each side of the vehicle 10. As a result, either side of a street or the like may be scanned by one of the probes 16 while the vehicle 10 is being driven in a given direction along the street.

A methane gas analyzer 28 is supported by a suspension system, generally designated at 30, in the vehicle 10 and has an inlet 32 and an outlet 34. A suction conduit 35 is connected to the outlet 34 of the analyzer 28 and to the manifold assembly 12 to draw gases through the analyzer, as will be described. The inlet 32 of the analyzer 28 is connected to the discharge conduit 26 of the blower 24 by a sampling conduit 36. The intake end 38 of the conduit 36 is merely inserted in the discharge conduit 26 of the blower 24, such that the intake end 38 will be exposed to a representative portion of the gases drawn by the blower 24 through one of the probes 16. It may be noted here, however, that a typical analyzer 28 has a capacity of 15 cubic feet per hour for a gas being analyzed thereby. Therefore, the sampling conduit 36 is appreciably smaller than the conduits 18 and 26 connected to the blower 24 to direct only a minor portion of the gases discharged by the blower 24 to the analyzer 28. It should also be noted that the capacity of a typical blower 24 is substantially higher than the capacity of a typical analyzer 28.

A three-way valve 40 is interposed in the sampling conduit 36 and is provided with an outlet coupling 42 for alternately connecting the analyzer 28 to the blower 24 and to a hand probe, as will be described in detail below. A dryer 44 containing a suitable desiccant, such as silica gel, is interposed in the sampling conduit 36 downstream of the valve 40, and a suitable ultra-fine filter 46 is interposed in the conduit 36 adjacent the dryer 44. The ultra-fine filter 46 may be of any desired construction, such as a Kel-F, made by the Beckman Instrument Company of Fullerton, California—the requirement being that the filter 46 remove substantially any solid particles which may be entrained in the gas sample being directed to the analyzer 28. It will also be readily understood that the dryer 44 and filter 46 are suitably mounted in accessible positions in the vehicle 10.

An amplifier 48 and recorder 50 are mounted in a suitable housing 52 and supported on the platform 14 in proximity with the analyzer 28. The amplifier 48 is connected to the analyzer 28, as will be described in detail below, such that the output of the analyzer 28 is amplified and recorded by the recorder 50 on a chart 54 exposed to an operator in the vehicle 10. Therefore, the operator can make notations on the chart 54 during operation of the system to indicate the locations along a street which the vehicle 10 is being driven—to correlate the chart 50 with the area being surveyed, as will be described in more detail below.

Figure 2:
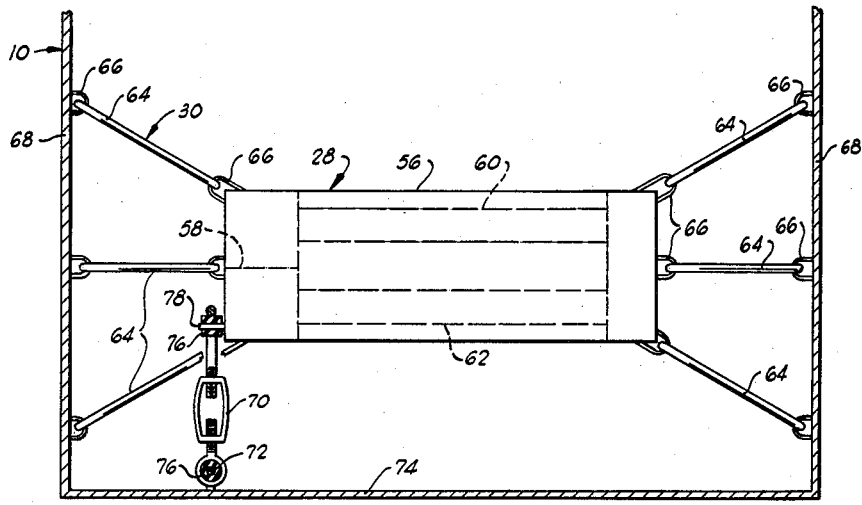
FIGURE 2 is a plan view of the gas analyzer and motor vehicle mounting therefor.

In a preferred embodiment of this invention, the analyzer 28 is supported in a box-shaped housing 56 as shown in FIGS. 1 and 2, and contains a diaphragm 58 which is flexed in response to the amount of absorption of infrared rays passing through a sample tube or cell 60 compared with the amount of absorption of infrared rays passed through a standard tube or cell 62. A typical analyzer of this type is sold by Beckman Instruments, Inc. of Fullerton, California, under the name L/B Infrared Analyzer, Model 15a. In this type of analyzer, infrared rays are passed through the sample cell 60 and the standard cell 62 at a frequency of 10 cycles per second and the diaphragm 58 forms one plate of a capacitor 59 (as shown schematically in FIG. 3), such that the output of the capacitor will indicate the parts per million of methane in a gas sample being passed through the sample cell 60, and the output of the capacitor will be at a frequency of 10 cycles per second. The suspension system 30 is provided, not only to support the analyzer 28, but, in addition, has a resonant frequency different from (and preferably above) the frequency of the analyzer to minimize error in the output of the analyzer 28 which would otherwise be caused by vibration associated with movement of the vehicle 10. It will be understood that the resonant frequency of the system 30 should not be a harmonic of 10 c.p.s., and we have found that when the system 30 has a resonant frequency of about 13 c.p.s., superior results are obtained.

The suspension system 30 includes a plurality of elastic cables 64 connected by means of eyes or the like 66 to the opposite ends of the housing 56 and the side walls 68 of the vehicle 10. One of the cables 64 is connected to each corner of the analyzer housing 56, and one of the cables 64 is connected to the central portion of each end of the analyzer housing 56. Those cables 64 connected to the upper corners of the housing 56 are extended upwardly and outwardly from the respective corners, and those cables 64 connected to the lower corners of the housing 56 are extended downwardly and outwardly from the respective corners, such that movement of the analyzer 28 in any direction in the vehicle 10 is minimized. Each cable 64 may be of any desired construction which has a combination of elastic and damping characteristics to allow some movement of the housing 56, yet prohibit the housing 56 from vibrating for any appreciable length of time or at any appreciable amplitude. We have found that each cable 64 can easily be in the form of an elastic shock cord which, as is well known, comprises a plurality of rubber bands enclosed in a suitable fabric cover to provide the cord with both elasticity and friction type damping.

The suspension system 30 also includes a turnbuckle 70 at the end of the housing 56 associated with the diaphragm 58 which extends into connection with a suitable eye or the like 72 mounted on a suitable support, such as the rear wall 74 of the vehicle 10. The forward end of each turnbuckle 70 is telescoped over a rubber bushing or grommet 76 which is in turn secured to the respective end of the housing 56 by a bolt or the like 78. A similar rubber bushing 76 is secured over the eye 72 to prevent lengthwise movement of the turnbuckle 70, yet allow at least limited pivoting movement of the turnbuckle. It will be apparent that the turnbuckle 70 may be lengthened or shortened, as desired, to properly position the analyzer 28 and to prevent any appreciable movement forwardly and rearwardly in the vehicle 10. The rubber bushings 76 will dampen any vibration in the vehicle 10 being transmitted through the turnbuckle 70, such that the diaphragm 58 of the analyzer 28 will be subjected to the minimum vibrations.

As previously indicated, the diaphragm 58 of the analyzer 28 is subject to acceleration forces, particularly when the analyzer is moved in a direction substantially perpendicular to the average plane of the diaphragm. The diaphragm 58 is normally formed of an extremely thin material and is not held taut in the analyzer. Therefore, the diaphragm normally assumes a somewhat convoluted configuration. In order to minimize flexing of the diaphragm by acceleration forces, we extend the turnbuckle 70 in a direction which is most nearly perpendicular to the adjacent face of the diaphragm. It may also be noted that the cables 64 can be lengthened and shortened as necessary to turn the housing 56 in such a direction that the turnbuckle 70 extends along the preferred line. In installing the housing 56 in the vehicle 10, the housing is oriented by a trial and error method until the turnbuckle 70 is extended at the desired direction from the diaphragm which will be apparent by observing the response of the analyzer to manual vibration of the housing 56 with the housing in various positions. The diaphragm 58 is positioned substantially vertically in the vehicle 10, but may be turned at a slight angle to the vertical, since the diaphragm will not lie in a single plane, as indicated above.

Figure 5:
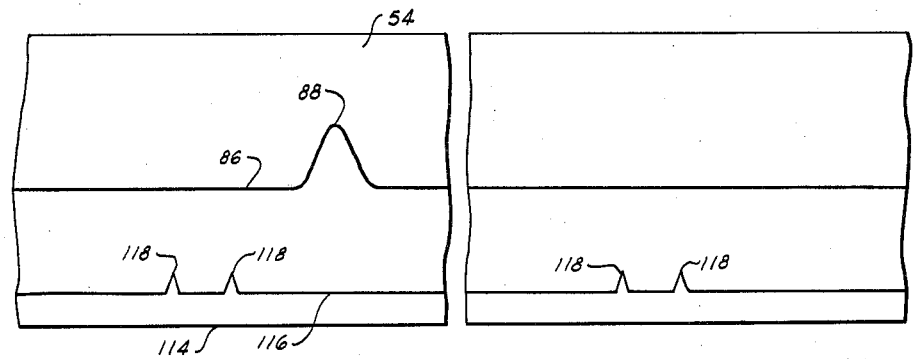
FIGURE 5 is a plan view of a trace which may be obtained with the present invention.
Figure 3:
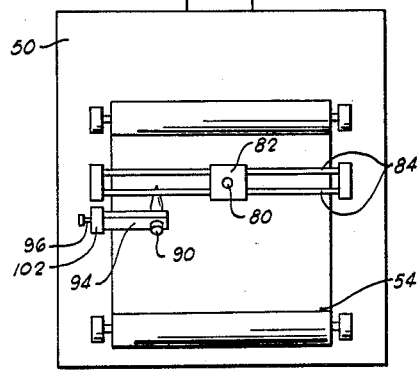
FIGURE 3 is a plan view of a preferred recording mechanism and a schematic illustration of the connection of the recorder to an analyzer.

The capacitor 59 of the analyzer 28 is connected to a suitable amplifier 48 as illustrated schematically in FIG. 3 to amplify the output of the analyzer. The amplified analyzer output is fed to the recorder 50 for recording on the chart 54. The recorder 50 may be of any suitable type having a recording pen 80 movable across the chart 54 in response to the input to the recorder. In a preferred embodiment of this invention, the recording pen 80 is mounted in a holder 82 which is slidable transversely across the chart 54 on a pair of guide rods 84. The pen 80 extends substantially vertically and draws a curve on the chart 54, as indicated at 86 in FIG. 5, showing the response of the analyzer 28. As will be observed, the curve 86 extends substantially horizontally throughout most of its length, which indicates areas of minimum methane concentration. When an area of increased methane concentration is reached, the pen 80 is displaced to provide a peak 88.

Figure 4:
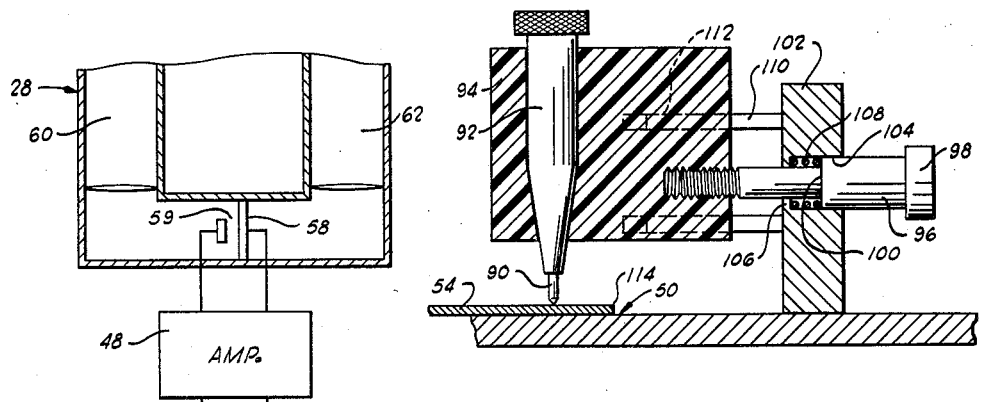
FIGURE 4 is a vertical sectional view through a fiducial pen assembly incorporated in the recording mechanism.

In order to facilitate the correlation of the curve 86 to an area which has been surveyed, we provide an auxiliary pen 90, referred to herein as a fiducial pen, on the recorder 50 as illustrated in FIGS. 3 and 4. The pen 90 is mounted in a suitable pen holder 92, and the holder 92 is in turn secured in a guide block 94 to extend the pen 90 at an angle as shown in FIG. 3 and as will be explained. The guide block 94 may be formed of any suitable material, such as nylon, and is secured on the threaded inner end of a bolt member 96. The bolt 96 has a head portion 98 on the outer end thereof and is reduced in diameter at the central portion thereof to form an inwardly facing shoulder 100. A support block 102 is suitably secured on the recorder 50 adjacent one edge of the chart 54 and has a bore 104 therethrough slidingly receiving the bolt 96. A stop flange 106 is formed in the inner end of the bore 104 of a size to slidingly receive the reduced diameter portion of the bolt 96 and form a stop for a helical compression spring 108 positioned in the bore 104 against the shoulder 100. It will be apparent that the spring 108 continually urges the bolt 96, and hence the guide block 94, outwardly. Also, a pair of guide rods 110 extend inwardly from the support block 102 into mating bores 112 in the guide block 94 to retain the guide block at the desired angle with respect to the recorder 50.

The guide block 94 is supported at an angle and is positioned adjacent the recorder pen guide rods 84, such that the fiducial pen 90 will contact the chart 54 in proximity with the path of movement of the recording pen 80. Also, the guide rods 110 and bores 112 are sized to position the pen 90 adjacent one edge 114 of the chart 54 when the spring 108 is expanded. Therefore, the pen 90 will normally draw a straight line 116 along the chart 54 adjacent the chart edge 114. When the operator desires to indicate a location on the chart 54, such as one side of a street intersection, he momentarily pushes the bolt 96 inwardly and the bolt, guide block 94 and pen 90 will be returned to the position shown in FIG. 3 by the spring 108. As a result, the pen 90 will draw a peak or pip 118 on the chart 54 at approximately the position of the recording pen 80 when the bolt 96 is pushed. It will be apparent that the pips 118 may be used to precisely correlate the location of a peak 88 in the curve 86 with the proper geographical location. Also, the operator can write any desired information on the chart 54.

Figure 6:
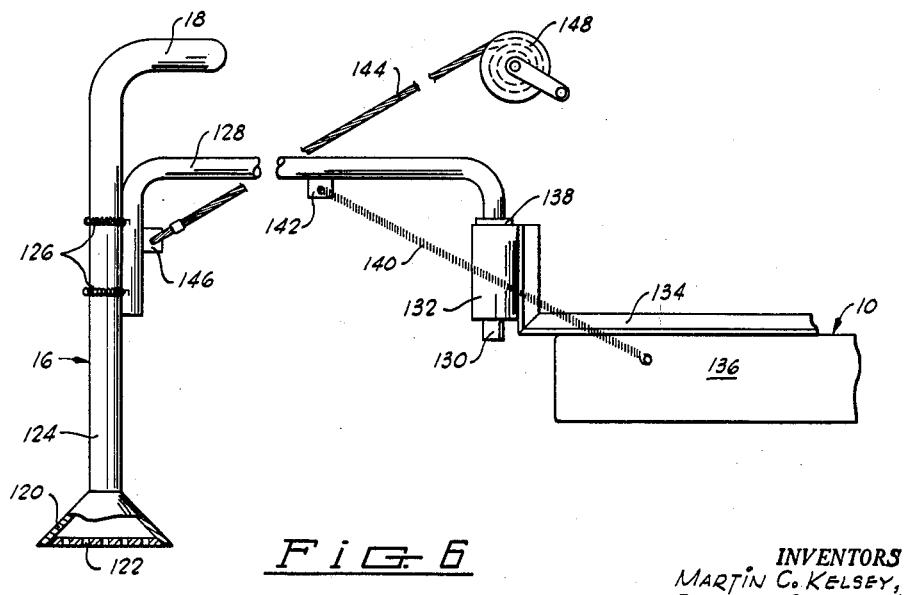
FIGURE 6 is a front elevational view of a probe support for a motor vehicle, with portions of the structure shown schematically to more clearly illustrate the invention.

A typical probe 16 is illustrated in detail in FIG. 6 and comprises a funnel-shaped housing 120 having a suitable screen 122 secured across the lower, larger end thereof and having its upper end suitably connected to the outer end 124 of the respective flexible conduit 18. Each probe 16 is supported by means of suitable clamps 126 extending from a support rod 128 around the conduit 18 a short distance above the respective funnel-shaped member 120. The rod 128 has a downward end portion 130 of a size to be journaled in a vertically extending socket 132 of a bracket 134, and the bracket 134 is suitably secured to one end of the front bumper 136 of the vehicle 10. A washer 138 is secured around the downturned end portion 130 of the rod 128 to contact the upper end of the socket 132 and support the rod 128 for pivotal movement about a vertical axis defined by the socket 132, such that the proble 16 may be moved toward or away from the respective side of the vehicle 10 upon swinging movement of the rod 128.

In order to control the position of each probe 16, a tension spring 140 is secured to the bumper 136 and to a flange 142 provided on a medial portion of the respective rod 128, such that the respective spring 140 tends to pivot the rod 128 forwardly with respect to the vehicle 10. A suitable cable 144 is secured to the outer end portion of the rod 128 in any suitable manner, such as by means of an apertured flange 146, and extends inside of the vehicle 10 where the cable is wound around a reel 148. The reel 148 is positioned within the reach of the operator of the present apparatus, such that the operator can retract either or both of the probes 16 by winding the cables 144 on the reels 148 against the actions of the springs 140. Also, of course, the probes 16 are moved independently, and in a normal operation only one of the probes 16 will be extended from the respective side of the vehicle 10, since only one of the probes 16 is ordinarily connected to the blower 24 through the three-way valve 20, as previously described in connection with FIG. 1. It may also be noted that each probe 16 is secured to the respective support arm 128 in such a position that the funnel-shaped housing 120 extends into proximity with the surface over which the vehicle 10 is being driven. Therefore, atmospheric gases lying close to this surface will be drawn into the housing 120 and through the flexible conduit 18. The screen 122 prevents the probe 16 from picking up large articles which may be lying on the street or the like, and the flexible conduit 18 may be easily bent in the event the respective housing 120 comes in contact with an obstruction along the street.

*Operation*

Before the present system is used for making a particular survey, and periodically throughout a working day, the analyzer 28 is preferably checked for accuracy. This check may be easily performed by passing a calibrated gas through the sample cell 60 of the analyzer 28 and noting the response of the recorder 50 to this known sample. When the system is utilized for locating leaks in a gas distribution system of an urban area, we have found that a calibrated gas comprising pure nitrogen and a calibrated gas comprising nitrogen having 100 parts per million of methane therein provide desirable checks of the accuracy of the analyzer 28. The pure nitrogen provides a zero check and the nitrogen containing 100 parts per million provides a maximum response check. It will be readily understood that these calibrated gases may be stored in suitable bottles in the vehicle 10 and connected to the inlet 32 of the analyzer 28 when the calibration checks are desired.

In placing the present system in operation, the appropriate probe 16 is swung outwardly from the side of the vehicle 10 corresponding to the side of the street along which the survey is to be made. It will be apparent that when the respective cable 144 (FIG. 6) is slacked by turning of the respective reel 148, the respective probe 16 will be moved outwardly by retraction of the respective spring 140. Also, the three-way valve 20 (FIG. 1) is set to provide communication between the blower inlet 22 and the probe 16 to be utilized, and the three-way valve 40 is set to provide communication from the inlet end 38 of the tube 36 to the analyzer 28.

As the vehicle 10 is driven along the street being surveyed, a substantial proportion of atmospheric gases lying along the portion of the street traversed by the probe 16 being utilized are drawn into the respective probe 16 and are blown past the end 38 of the sample conduit 36. Simultaneous with the movement of a substantial amount of the atmospheric gases by the blower 24, the intake manifold 12 of the vehicle 10 draws a portion of these gases through the sampling conduit 36, the analyzer 28 and the conduit 35. As previously indicated, the operating capacity of the analyzer 28 is small compared with the capacity of the blower 24, such that only a minor portion of the gases handled by the blower 24 are actually passed through the analyzer 28. However, since the inlet 38 of the sampling conduit 36 is interposed in the discharge conduit 26 of the blower 24, those gases passing through the analyzer 28 will be representative of the gases handled by the blower 24. It may be also noted here that since the blower 24 handles an appreciable quantity of gas, the gas drawn in through the extended probe 16 will be representative of the atmospheric gases along the respective side of the street being surveyed. We have found that when a blower of 6,000 cubic feet per hour is utilized, leaks in a gas distribution system may be detected even in the presence of relatively high winds and when the extended probe 16 is moved slightly upstream of the leak.

All of the gases passed through the dryer 44 and filter 46 are effectively dried and filtered to provide accurate operation of the analyzer 28. As long as the gas being passed through the sample cell 60 of the analyzer 28 contains no methane, or only an extremely minor portion of methane, the output of the analyzer 28 will be recorded by the recorder 50 on the chart 54 as a substantially straight line 86 (FIG. 5). When the gas being passed through the analyzer 28 contains any appreciable portion of methane, the diaphragm 58 of the analyzer 28 is flexed by the absorption of infrared rays passing through the sample gas, such that an appreciable signal is created across the capacitor 59 formed by the diaphragm 58. The amplitude of the signal will be in proportion to the percentage of methane in the gas being passed through the analyzer 28, such that the peaks 88 of the curve 86 provided on the chart 54 will not only be indicative of the presence of leaks, but also the severity of the leaks.

As a record is being made on the chart 54, the chart 54 is driven lengthwise at a speed related to the speed of the vehicle 10. This may be easily accomplished by always driving the vehicle 10 at a rather precise speed, such as three miles per hour, and driving the chart 54 at a fixed speed. Divisions on the chart 54 can then be rather precisely related to distances along the area being surveyed. When the fiducial pen 90 is used, the operator of the system momentarily pushes the bolt 96 inwardly each time the vehicle 10 crosses one side of an intersection, such that the precise location of a leak in a given block can be easily determined from the chart 54, and adequate measures can be taken to fix the leak.

Figure 7:
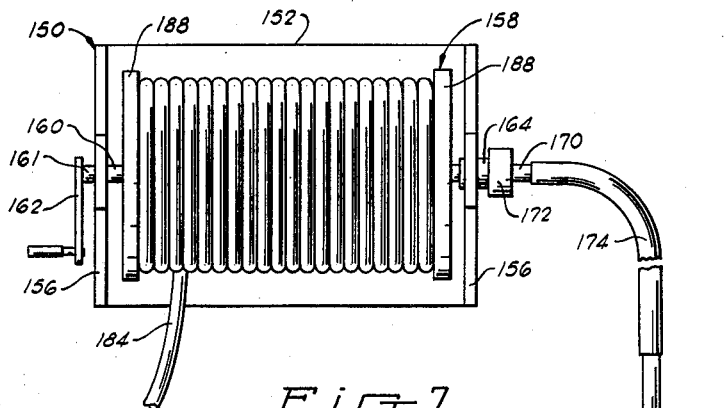
FIGURE 7 is a front elevational view of a reel and hand probe assembly for use in connection with the structure illustrated in FIG. 1.
Figure 8:
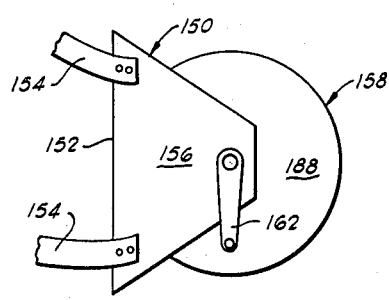
FIGURE 8 is a side elevational view of the reel structure illustrated in FIG. 7.
Figure 9:
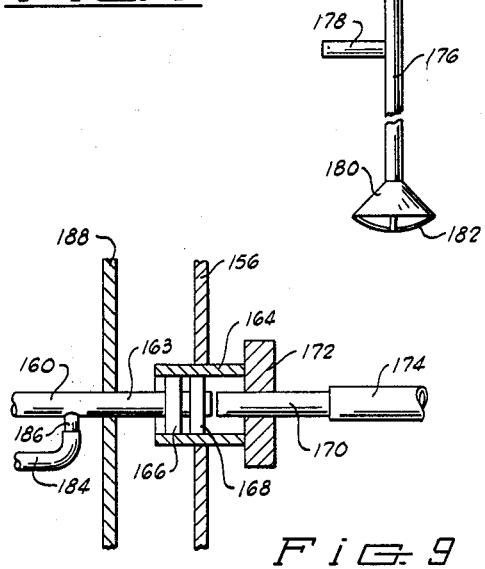
FIGURE 9 is an enlarged sectional view through one end of the reel structure illustrated in FIG. 7.

In addition to the apparatus illustrated in FIGS. 1 through 6 for surveying streets and alleys of urban areas or the like, the present invention also contemplates the use of a hand probe assembly 150 as illustrated in FIGS. 7, 8 and 9. The assembly 150 comprises a suitable bracket 152 of a size to be strapped across the chest of an operator by means of a suitable harness 154 for easy portability of the assembly 150. Flanges 156 extend forwardly from the opposite ends of the bracket 152 for supporting a reel generally designated by reference character 158. The reel 158 includes a hollow shaft 160 having one end portion 161 thereof extending through and journaled in one of the bracket flanges 156 and having a handle 162 on this end. The handle 162 is of any desired construction and is secured to the end 161 of the shaft 160 to plug or close this end of the shaft. The opposite end 163 of the shaft 160 extends into a hub 164 rigidly secured in the respective flange 156. A bearing 166 is mounted on the end 163 of the shaft 160 within the hub 164 to facilitate rotation of the shaft 160 with respect to the hub 164. A suitable sealing ring 168 is mounted in the hub 164 around the end 163 of the shaft 160 outwardly of the bearing 166 to prevent leakage from the hub 164 around the shaft 160. A suitable tubular connector 170 is rigidly secured in a flange 172 mounted on the outer end of the hub 164 to provide communication between the hollow shaft 160 and the connector 170, even during rotation of the shaft 160, for purposes which will be described. A flexible conduit 174 is secured around the tubular connector 170 and extends into connection with a hand probe 176. The hand probe 176 has a suitable handle 178 projecting from one side thereof and a funnel-shaped housing 180 on the lower end thereof. Suitable wire guards 182 are preferably provided on the lower end of the housing 180 to properly space the housing 180 from the surface of the ground or the like when the hand probe 176 is being utilized.

Another flexible conduit 184 of substantial length is connected at one end thereof to a suitable coupling 186 provided on an intermediate portion of the shaft 160 to provide communication between the conduit 184 and the hand probe 176 through the hollow shaft 160, hub 164, connector 170, and conduit 174. The conduit 184 is wound on the hollow shaft 160 between a pair of end plates 188 rigidly mounted on the shaft 160 adjacent the flanges 156 of the bracket 152. The opposite end of the conduit 184 is connected to the connector 42 (FIG. 1) of the valve 40 when the hand probe assembly 150 is to be utilized.

When using the hand probe assembly 150, the blower 24 is stopped and no gases are drawn through the probes 16 mounted on the vehicle 10. The valve 40 is positioned to provide communication between the connector 42 and the sampling conduit 36, such that gases will be drawn through the hand probe 176 by action of the intake manifold assembly 12 of the vehicle 10. It will be understood that the engine of the vehicle 10 is in operation during use of the hand probe 176.

During use of the hand probe 176, the atmospheric gases drawn into the hand probe will be passed through the same flow path (including the entire length of the flexible conduit 184), such that the time delay between the contact of a possible leak and actuation of the analyzer 28 will be the same, regardless of the distance of the operator utilizing the hand probe 176 from the vehicle 10. Therefore, an operator can walk at a fairly steady pace with the hand probe assembly 150, and the chart 54 of the recorder 50 may be operated at a fixed rate of speed, such that the chart may be easily correlated with the survey made by the hand probe assembly 150. As the operator utilizing the assembly 150 walks away from the vehicle 10, the flexible conduit 184 will unwind from the reel 158 automatically and the operator merely tends to manipulation of the hand probe 176. As previously indicated, the guards 182 of the hand probe 176 are ordinarily maintained substantially in contact with the ground being surveyed to properly position the open end of the housing 180 and assure that any methane lying along the surface of the ground will be drawn into the hand probe 176. When the operator using the assembly 150 walks toward the vehicle 10, he merely operates the handle 162 at a uniform rate to continually wind the flexible conduit 184 on the reel 158—thereby automatically storing the conduit 184.

In the embodiment previously described, the gas being sampled is drawn through the analyzer 28 by suction from the engine intake manifold 12, such that the pressure of the gas passing through the analyzer is at approximately atmospheric pressure. Such a system is sufficiently sensitive for most gas leak surveys. However, we have found that under some operating conditions, it is desirable to pass the gas being sampled through the analyzer at an increased pressure, such as two atmospheres, in order that an increased number of molecules of the gas will be present in the sample cell 60 at each instant of operation. The apparatus for this embodiment is partially illustrated in FIG. 10.

Figure 10:
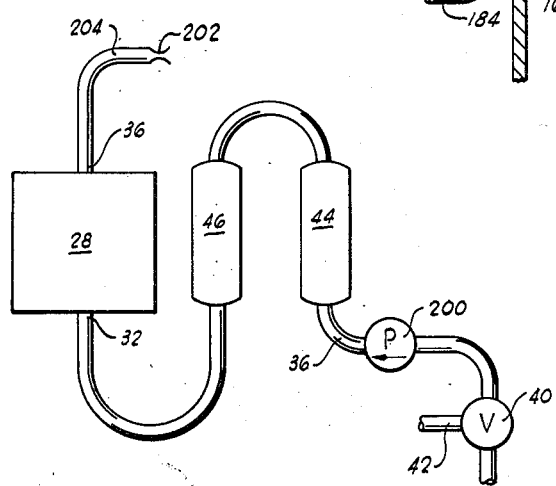
FIGURE 10 is a schematic elevational view of a modified detecting system.

In the embodiment shown in FIG. 10, the sampling conduit 36 extends from the discharge of the blower 24 to the inlet 32 of the analyzer 28 and has the valve 40, dryer 44 and filter 46 interposed therein in the same manner as the apparatus shown in FIG. 1. In addition, a suitable compressor 200 is interposed in the conduit 36 between the valve 40 and the dryer 44 to increase the pressure of the sample gas being led to the analyzer 28. In this position of the compressor 200, the gas being sampled can be obtained either from the probes 16 on the vehicle or from the hand probe 176. It will be understood that the compressor may be of any suitable type to increase the pressure of the sample gas any desired extent and may be driven in any suitable manner, such as by a power take-off from the vehicle. In addition, we prefer to connect a suitable orifice 202 to the outlet 34 of the analyzer 28 by a conduit 204 to maintain the desired pressure in the analyzer 28.

From the foregoing it will be apparent that the present invention will materially increase the safety of gas distribution systems by facilitating the detection and location of leaks in the distribution systems. The present apparatus may be moved along a street or the like adjacent a portion of a gas distribution system and will automatically indicate the location of any leaks along the street while the unit is being moved at a relatively fast pace. The probes are mounted on the vehicle in such positions to survey either side of a street and are easily manipulated from inside of the vehicle to provide a substantial time saver and facilitate a complete gas leak survey. The diaphragm-type analyzer is supported in the vehicle containing the system in such a manner that vibrations or erratic movements of the vehicle will be dampened before reaching the analyzer and the efficiency of the analyzer will not be materially impaired by movement with the vehicle. It will also be apparent that the hand probe assembly adapts the system for surveys in all areas, whether or not they are accessible by means of a motor vehicle. It will further be apparent that by movement of a substantial quantity of air to be sampled by the analyzer, an accurate and representative cross-section of atmospheric gases along the route of the surveying vehicle is taken to assure the location of leaks along this route, regardless of wind conditions.

Changes may be made in the combination and arrangement of parts or elements, as well as steps and procedures, as heretofore set forth in the specification and shown in the drawings, it being understod that changes may be made in the embodiments disclosed without departing from the spirit and scope of the invention as defined in the following claims.

We claim:

1. Apparatus for detecting fuel gas leaks along a street or the like, comprising a motor vehicle, a fuel gas concentration analyzer having an inlet and an outlet, means for mounting the analyzer on the vehicle, a blower on the vehicle having an inlet and an outlet and having a capacity substantially larger than the gas capacity of the analyzer, a probe carried by the vehicle in a position to scan a path along the street during movement of the vehicle, a first conduit interconnecting the probe and the blower inlet for moving a substantial gas stream through the probe and blower compared with the capacity of the analyzer, and a sampling conduit communicating with the blower outlet and analyzer inlet for directing a portion of said gas stream through the analyzer.

2. Apparatus as defined in claim 1 wherein said probe is supported on one side of the vehicle, and characterized further to include a second probe supported on the opposite side of the vehicle, a second conduit connected with the second probe and the blower inlet, and valve means interposed in said first and second conduits for controlling communication between said probes and blower inlet.

3. Apparatus as defined in claim 1 wherein said first conduit is flexible, and characterized further to include a bracket rigidly mounted on the vehicle, a support rod journaled in a mating bore in said bracket for pivotal movement about a vertical axis and being extended at a right angle to said axis, clamp means securing said first conduit to said support rod in spaced relation from said axis, said clamp means being secured to said first conduit in a position on said first conduit to position said probe in proximity with the street, and means for turning said support rod about said axis to control the spacing between the vehicle and the probe.

4. Apparatus as defined in claim 3 wherein said means for turning said support rod comprises a tension spring secured to said support rod and the vehicle urging the support rod toward the vehicle, a cable secured to said support rod and extended into the vehicle in a direction opposed to the tension of said spring, and a reel connected to said cable within the vehicle.

5. Apparatus as defined in claim 1 wherein said motor vehicle is of the internal combustion type having an air intake manifold, and characterized further to include a suction conduit connected to said analyzer outlet and said intake manifold for drawing a gas sample from said blower outlet through said analyzer.

6. Apparatus as defined in claim 1 characterized further to include a screen secured across said probe, a gas dryer interposed in said sampling conduit, and an ultra-fine filter interposed in said sampling conduit.

7. Apparatus as defined in claim 1 characterized further to include a compressor interposed in said sampling conduit for passing said portion of said gas stream through the analyzer at a pressure above atmospheric.

8. Apparatus as defined in claim 7 characterized further to include an orifice connected to the output of the analyzer to facilitate the retention of pressure on the gas passing through the analyzer.

9. Apparatus for detecting fuel gas leaks, comprising a motor vehicle of the internal combustion type having an intake manifold, a fuel gas concentration analyzer carried by the vehicle having an inlet and an outlet, a suction conduit connected to the analyzer outlet and to said intake manifold for drawing gas through the analyzer, a flexible conduit connected to said analyzer inlet, a reel receiving said flexible conduit, and a hand probe carried by said reel in communication with said flexible conduit for scanning a possible gas leak area.

10. Apparatus as defined in claim 9 wherein said reel comprises a U-shaped bracket having opposed flange portions, a hub secured in one of said flange portions, a hollow shaft journaled at one end thereof in said hub and extending through the opposite flange portion, a coupling on said hollow shaft connected to said flexible conduit for providing communication between said flexible conduit and said hollow shaft while a portion of said flexible conduit is wound on said shaft, a coupling secured in said hub in communication with said one end of said shaft, a handle secured in the opposite end of said shaft and closing off the respective end of said shaft, and a second flexible conduit connected to said last-mentioned coupling and said hand probe to direct gas from said probe through said analyzer.

11. In a fuel gas detecting system, a motor vehicle having side walls; an alternating current, infrared light type gas analyzer having a diaphragm therein forming the plate of a capacitor and movable in response to the concentration of methane in gas passing through the analyzer; elastic means suspending said analyzer in the vehicle with the diaphragm of said analyzer extending substantially vertically to minimize flexure of said diaphragm upon movement of the vehicle, said resilient supporting means having a resonant frequency different from the frequency of said analyzer, and means for passing gas from adjacent the vehicle through the analyzer.

12. A system as defined in claim 11 wherein the resonant frequency of said resilient supporting means is greater than, but not a harmonic of, the frequency of the analyzer.

13. A system as defined in claim 11 wherein said analyzer is housed in a box-shaped housing and said resilient means includes an elastic shock cord anchored to each of the corner portions of said housing and the adjacent side wall of the vehicle, each of said cords connected to an upper corner of said housing being extended upwardly and outwardly from the housing and each of said cords connected to a lower corner of the housing being extended downwardly and outwardly from the housing, an elastic material connector attached to the end of the housing associated with the diaphragm, and a turnbuckle secured to said elastic material connector and to the vehicle, said turnbuckle being extended along a line substantially perpendicular to one face of the diaphragm.

14. In a method of detecting fuel gas leaks with a gas concentration analyzer mounted in a motor vehicle, the improvement which comprises continuously drawing into the vehicle a stream of atmospheric gases along the path of travel of the vehicle at a flow rate substantially greater than the gas capacity of the analyzer, and directing only a portion of said stream through the analyzer.

15. The method defined in claim 14 wherein the stream of atmospheric gases are drawn into the vehicle from adjacent the surface over which the vehicle is traveling.

16. The method defined in claim 14 wherein the gases passed through the analyzer are at substantially atmospheric pressure.

17. The method defined in claim 14 wherein the gases passed through the analyzer are at a pressure substantially greater than atmospheric.

References Cited in the file of this patent

UNITED STATES PATENTS

| | | |
|---|---|---|
| 2,277,505 | Barker et al. | Mar. 24, 1942 |
| 2,458,258 | Furr | Jan. 4, 1949 |
| 2,514,690 | Bliss et al. | July 11, 1950 |
| 2,576,381 | Wright | Nov. 27, 1951 |
| 2,803,847 | Hobbs | Aug. 27, 1957 |
| 2,879,663 | Thomas | Mar. 31, 1959 |